April 1, 1958     W. C. SEALEY     2,829,354
COIL WITH END TURN HAVING INCREASED INSULATION
Filed April 29, 1954     2 Sheets-Sheet 1
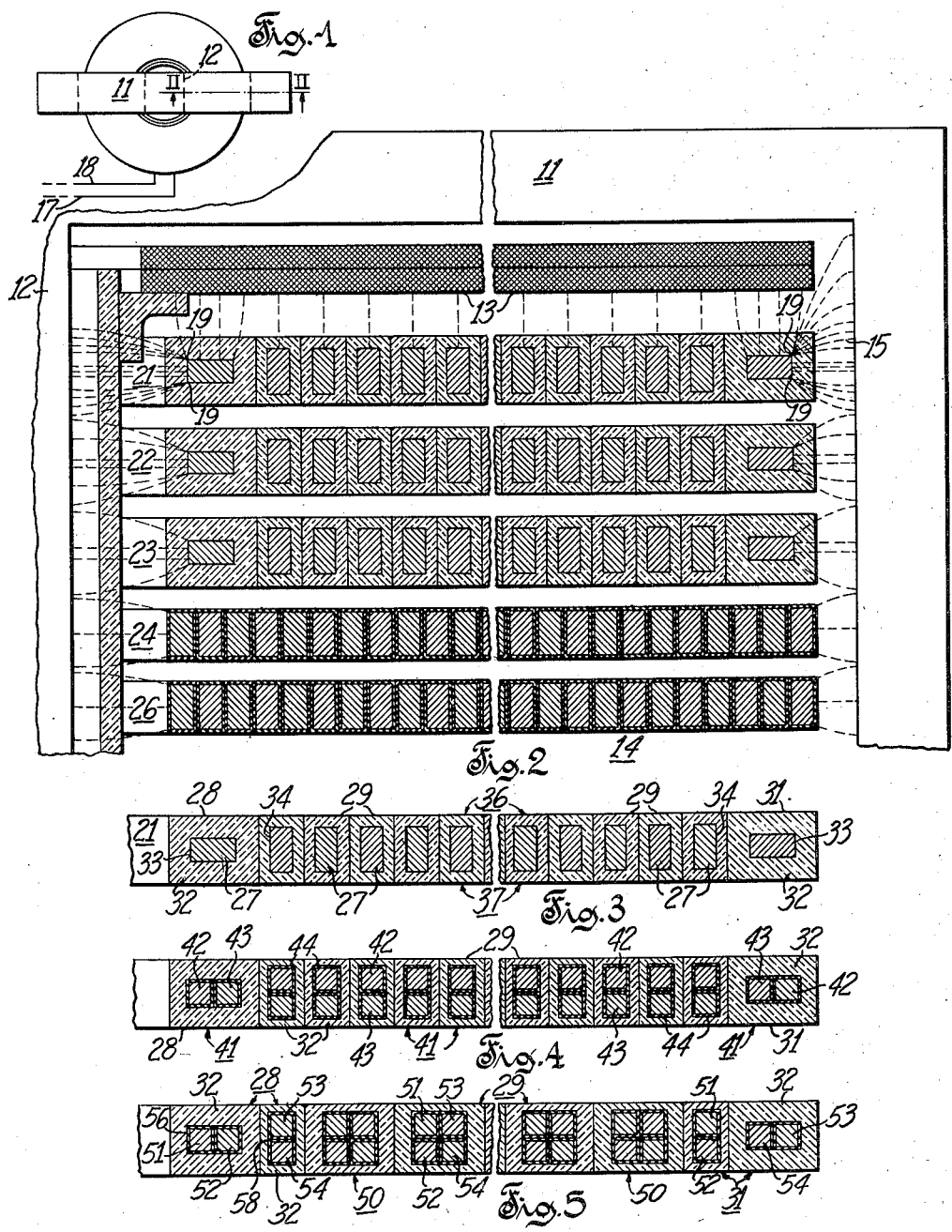
Inventor
William C. Sealey
by Richard E. Cummins
Attorney April 1, 1958　　　W. C. SEALEY　　　2,829,354
COIL WITH END TURN HAVING INCREASED INSULATION
Filed April 29, 1954　　　　　　　　　　　2 Sheets-Sheet 2

Inventor
William C. Sealey
by Richard E. Cummins
Attorney

__United States Patent Office__

2,829,354
Patented Apr. 1, 1958

2,829,354

COIL WITH END TURN HAVING INCREASED INSULATION

William C. Sealey, Wauwatosa, Wis., assignor to Allis-Chalmers Manufacturing Company, Milwaukee, Wis.

Application April 29, 1954, Serial No. 426,529

11 Claims. (Cl. 336—69)

This invention relates in general to stationary induction apparatus which are provided with primary and secondary windings disposed on a magnetic core, and more particularly to an improved winding for such an apparatus.

A stationary induction apparatus, such as a transformer, usually comprises a magnetic core, primary and secondary windings disposed on the core, suitable insulation, mechanical bracing for holding the core and windings together as a unit, and a tank or casing which surrounds the unit.

For transformers of large ratings the primary or high voltage winding is usually constructed from a plurality of disk type coils, although cylindrical type coils may be used. A disk coil is usually formed from a rectangular conductor wound about an axis spirally in a flat plane, while a cylindrical coil is wound along an axis helically defining a cylinder. Insulation, such as cable paper, is applied to the conductor while the coil is being wound, or it may be applied while the conductor is being placed on its payout reel. When the conductor comprises a plurality of individual strands, the strands may be insulated from each other by thin cable paper, but the strand to strand insulation may be omitted if desired.

The coils which are positioned at the high voltage end of the winding, particularly the line coil, are subjected to increased voltage stresses, and are therefore provided with extra insulation. The extra insulation is required mostly on the extreme turns of these coils. The intermediate turns of the coils are located in a substantially uniform dielectric field compared to the dielectric field for the first and last turns. Likewise the first and last turns shield the intermediate turns from the effect of the high voltage to ground and therefore less insulation is required on the intermediate turns. Also the intermediate turns do not have their edges exposed as do the first and last turns and therefore the concentration of stress is more evenly distributed over the surface of the coil.

In order to stack the coils provided with extra insulation in the conventional manner with the rest of the winding, it is desirable to have the cross section of these coils uniform throughout. To achieve a uniform cross section it has been the practice in the past to wrap all the turns of each coil at the high voltage end of the winding with the same thickness of insulation required to protect the first and last turns. All the coils may then be stacked and braced in the conventional manner to provide a mechanically strong winding. For example, when the line coil for a disk type winding is being wound the portion of the rectangular conductor forming the first or inner turn is provided with extra insulation of predetermined thickness to protect that turn against voltage stresses. The remaining portion of the conductor forming the intermediate turns and the last or outer turn is provided with the same amount of insulation so that the line coil has a uniform cross section. The other high voltage coils are similarly wound.

The disadvantages of this type of construction are many. In a disk type winding the number of coil turns for a predetermined coil diameter is limited because of the extra insulation on the intermediate turns. Where the number of turns is fixed the diameter of the winding is increased due to the extra insulation. Another serious disadvantage is that the height of the winding is increased which adds to the physical size of the transformer. Labor and insulating material are wasted by providing more insulation on the intermediate turns than is required to properly insulate them. In addition, the cooling of the coil is much slower when the intermediate turns are wound with extra insulation. Comparable disadvantages are encountered in cylindrical type windings.

According to the present invention the above mentioned disadvantages have been eliminated by utilizing an improved type coil. The improved coil comprises a conductor having a substantially rectangular cross section defined by first and second sides normal to each other. The end portions of the conductor which form the first and last turns of the coil are wound so as to position the shorter sides of the rectangular cross section parallel to the axis of the coil, while the intermediate turns are wound so as to position the longer sides of the rectangular cross section parallel to the axis of the coil. Insulation of a predetermined thickness is provided on the end portions of the conductor which form the first and last turns of the coil to protect these turns against voltage stresses. The portion of the conductor forming the intermediate turns, since they are wound with the longer sides parallel to the axis of the coil, require considerably less insulation to bring the surface of the intermediate turns to the plane of the surfaces defined and established by the first and last turns.

While this invention is readily adapted to a coil formed from a rectangular conductor, it is not limited thereto. It will be apparent from reading the description which follows that conductors having other cross sections may be used if desired.

It is therefore an object of the present invention to provide an improved winding for a stationary induction apparatus.

Another object of the present invention is to increase the number of turns in a winding of a transformer having a predetermined amount of winding space.

A further object of the present invention is to provide an improved disk type coil winding for a transformer in which the coils at the high voltage end of the winding may be readily cooled.

A still further object of the present invention is to provide in a disk type coil winding for a transformer a line coil which is simple and economical to manufacture, is adapted to be supported evenly, and requires a minimum of insulating material.

Objects and advantages other than those mentioned above will be obvious from the following description when read in connection with the drawings in which:

Fig. 1 is a plan view of a typical stationary induction apparatus provided with a high voltage disk type coil winding embodying the present invention;

Fig. 2 is an enlarged sectional view of the winding shown in Fig. 1 taken along the line II—II;

Fig. 3 is a view of the line coil illustrated in Fig. 2;

Figs. 4 and 5 are views of modifications of the coil shown in Fig. 3;

Figures 6, 7, 8:
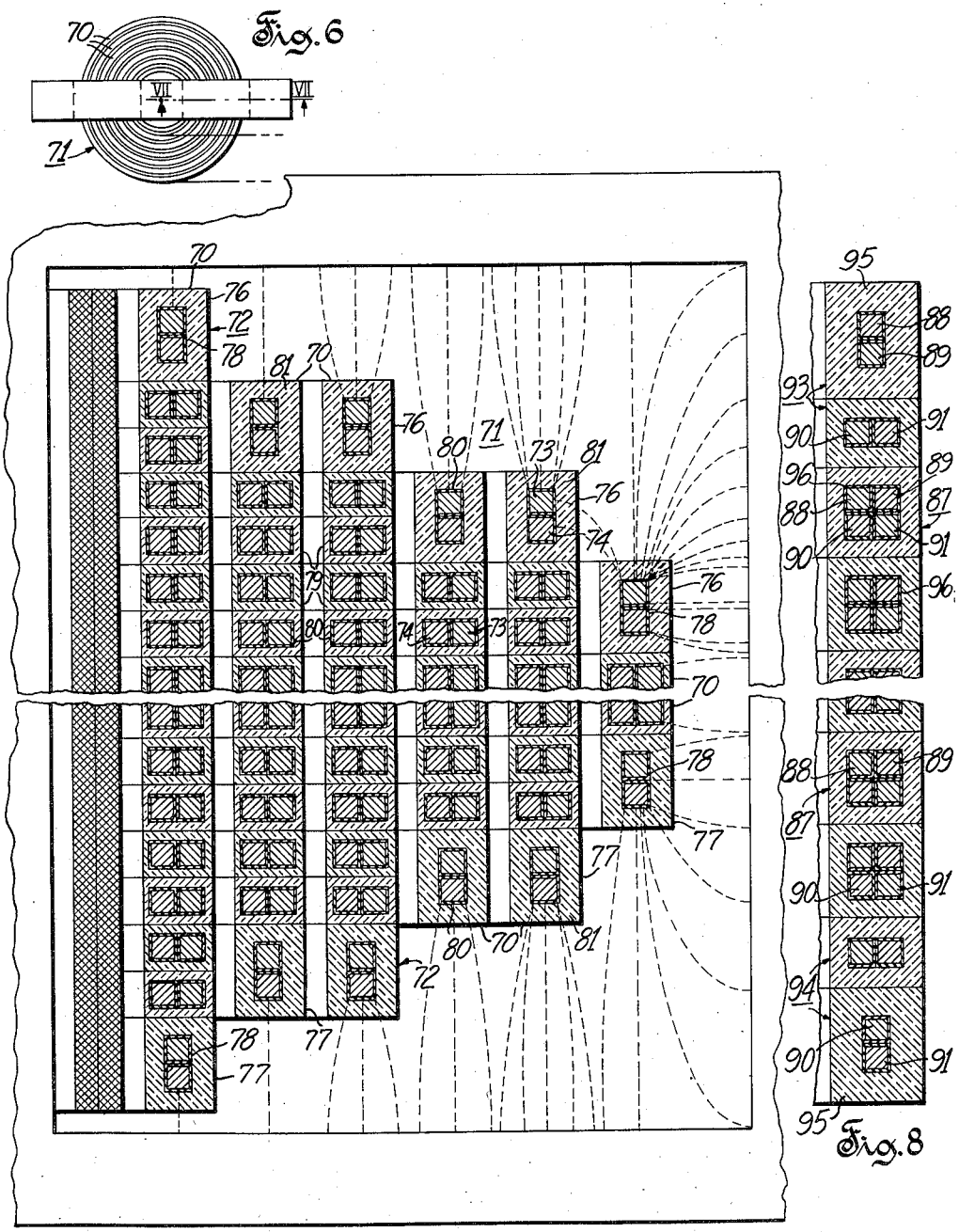
Fig. 6 is a plan view of a typical stationary induction apparatus provided with a high voltage cylindrical coil type winding embodying the present invention.
Fig. 7 is an enlarged sectional view of the cylindrical winding shown in Fig. 6 taken along the line VII—VII.
Fig. 8 is a view of a modification of the coil shown in Fig. 7.

Referring to the drawings, Figs. 1 and 2 show a transformer having a core, a high voltage winding, and a low voltage winding. For clarity the transformer tank and mechanical bracing means have been omitted.

The magnetic core may be any suitable type of core known in the art, a three legged shell type core 11 being shown merely for illustration. Disposed on the center leg 12 of the core are the low voltage and the high voltage windings of the transformer. As shown, the low voltage winding 13 comprises a disk type winding which surrounds the center leg, but other suitable low voltage windings may be used. High voltage winding 14 comprises a plurality of disk coils which are also disposed on the center leg 12. As shown the coils have an extended cross section the lengthwise direction of which is normal to the axis of winding 14. The coils are stacked one upon another and interconnected in a suitable manner to form a complete high voltage winding which may be energized from a suitable source of voltage (not shown) through supply lines 17 and 18.

Referring to Fig. 2, the coils at the high voltage end of the winding require more insulation than the other coils. This is because the potential of each coil with respect to ground decreases progressively from the high voltage end of winding 14. Also the 90 degree corners 19 of the inner and outer turns of the coils cause a greater concentration of voltage stresses at these edges due to the shape of the dielectric field 15. Hence, the inner and outer turns of coils, particularly the line coil 21, are the most critical points of the winding and must therefore have extra insulation. The thickness of the extra insulation required on the first or last turn is predetermined by methods well known in the art. The number of succeeding coils at the high voltage end of the winding which are provided with extra insulation may be varied depending on the conditions under which the transformer is to operate. As shown, two succeeding coils 22 and 23 are wound similar to line coil 21, coils 24 and 26 being wound in a conventional manner inasmuch as they do not require any extra insulation.

Fig. 3 illustrates more clearly how the conductor which forms the first turn and other turns of the coil is positioned and insulated to provide a coil of uniform cross section. Each coil comprises a conductor and suitable insulating material which is wrapped on the conductor before it is wound to form the disk coil. As shown, coil 21 comprises a rectangular conductor 27 which is wound in a flat spiral so as to form an inner or first turn 28, a plurality of intermediate turns 29, and an outer or last turn 31. If desired, conductor 27 may have rounded edges, even to the extent that the cross section of the conductor approaches an ellipse. The cross section of the conductor however should for practical purposes be symmetrical and have a major and a minor axis. Insulating material 32 may be any suitable material known in the art.

On winding coil 21 the end portion of the conductor forming the first turn 28 is wrapped with insulating material 32 to a predetermined thickness. The first turn 28 of the coil is then wound to position the shorter side 33 which is parallel to the minor axis of rectangular conductor 27 parallel to the axis of the coil. The height of the coil is thus established. The portion of conductor 27 which forms the intermediate turns 29 is wrapped with insulation to a lesser predetermined thickness and the conductor is wound so as to position the longer side 34 which is parallel to the major axis of the rectangular conductor parallel to the axis of the coil. The end portion of the conductor which forms the last turn 31 is wrapped with insulating material 32 to substantially the same thickness as the insulation on the first turn 28, and that portion of the conductor is wound so as to position the shorter side 33 or minor axis of the conductor parallel to the axis of the coil. The upper and lower surfaces 36 and 37, respectively, of the coil therefore define two parallel planes, resulting in a coil which may be readily supported in a conventional manner.

The advantages of this type of coil may readily be seen by assuming that rectangular conductor 27 has a cross section of one unit by two units and that the first and last turns 28, 31 require insulating material having a thickness of one unit to insure safe operation of the transformer. Under these assumptions the height of the coil 21 has been reduced one unit compared to coils constructed from teachings of prior art, the number of intermediate turns is greatly increased, and considerable labor and insulating material has been saved by eliminating the extra insulation on the intermediate turns. In addition the cooling of the coil is better because the heavily insulated turns 28 and 31 are only at the outside of the coil where they may be cooled from three sides.

Fig. 4 is similar to Fig. 3 except that conductor 27 is replaced by conductor 41 which is divided into two parallel strands 42, 43 in order to reduce the eddy current losses. Each strand is provided with relatively thin strand to strand insulation 44 in the conventional manner. The winding of the coil shown in Fig. 4 is substantially the same as that described with relation to coil 21 shown in Fig. 3. The portion of the stranded rectangular conductor 41 which forms the first turn 28 and last turn 31 may be wound either by turning the entire conductor 41 or by shifting or sliding strand 42 with respect to strand 43.

Fig. 5 is similar to Fig. 3 except that conductor 27 has been replaced by conductor 50 which has four electrically parallel strands 51, 52, 53, 54 and, as shown, are insulated from each other by a relatively small thickness of strand to strand insulation, such as cable paper. The two inner strands 51, 52 of first turn 28 are wound so as to position their shorter side 56 parallel to the axis of the coil while the outer two strands 53, 54, of first turn 28 are wound so as to position their longer side 58 parallel to the axis of the coil. The inner two strands 51, 52 of first turn 28 and the outer two strands 53, 54 of the last turn 31 are wrapped with insulation 32 of predetermined thickness. The intermediate turns 29 are wrapped with insulation of lesser thickness. This construction results in the coil having a uniform cross section while using a relatively small amount of insulation.

Figs. 6 and 7 show an embodiment of the present invention as applied to a plurality of cylindrical type coils 70 which are interconnected to form a complete winding 71. The coils have an extended cross section, the lengthwise direction of which is parallel to the axis of winding 71. Each coil 70 comprises a substantially rectangular conductor 72 which has two strands, 73, 74 wound helically along the axis of the winding but, if desired, a single strand conductor may be used. The portion of conductor 72 forming the first turn 76 and the last turn 77 are wound so as to position the longer side 78 parallel to the axis of winding while the portion of the conductor forming the intermediate turns 79 is wound to position the shorter side 80 parallel to the axis of the winding. Insulation 81 of predetermined thickness is disposed on the first and last turns 76, 77 while the intermediate turns 79 are provided with just enough insulation to form a coil of uniform cross section. As shown, the first and last turns 76, 77 of all the coils are provided with insulation of the same thickness but if desired the coils at the low voltage end of the winding could be wound in a conventional manner.

Fig. 8 is a modification of the cylindrical coils shown in Fig. 7. The coil shown in Fig. 8 comprises a conductor 87 having four parallel rectangularly shaped strands 88, 89, 90, 91 which are, as shown, insulated from each other by relatively thin layers of insulation 96. The construction is similar to that described with relation to the coil shown in Fig. 5. For example, the strands 88, and 89 of the first turn 93 and the strands 90, 91 of the last turn 94 are provided with insulation 95 the thickness of which is predetermined. It is therefore apparent that the advantages of the proposed construction apply equally as well to both cylindrical and disk type coil windings.

Although but a few embodiments of the present invention have been illustrated and described, it will be apparent to those skilled in the art that various modifications may be made therein without departing from the spirit of the invention or from the scope of the appended claims.

It is claimed and desired to secure by Letters Patent:

1. A coil for an electrical winding, said coil comprising a conductor having a rectangular cross section, said conductor being wound on an axis to form a first turn, a plurality of intermediate turns, and a last turn, end portions of said conductor forming said first and last turns being wound to position the shorter side of said cross section parallel to said axis, the intermediate portion of said conductor forming said intermediate turns being wound to position the longer side of said cross section parallel to said axis, insulation of predetermined thickness disposed on said first and last turns defining first and second surfaces of said coil, and insulation of a lesser thickness disposed on said intermediate turns extending to said surfaces to produce a coil of uniform cross section.

2. A winding for a stationary induction apparatus, said winding comprising a plurality of interconnected coils, one of said plurality of coils comprising a conductor having a substantially rectangular cross section, said conductor being wound on an axis to form a first turn, a plurality of intermediate turns, and a last turn, end portions of said conductor forming said first and last turns being wound to position the shorter side of said cross section parallel to said axis, the intermediate portion of said conductor forming said intermediate turns being wound to position the longer side of said cross section parallel to said axis, insulation of predetermined thickness disposed on said first and last turns defining first and second surfaces of said coil, and insulation of a lesser thickness disposed on said intermediate turns extending to said surfaces to produce a coil of uniform cross section.

3. A winding for a stationary induction apparatus, said winding comprising a plurality of disk type coils, at least one coil of said plurality of coils comprising a conductor having a cross section containing first and second pairs of sides of unequal lengths disposed substantially normal to each other, said conductor being wound spirally on an axis to form a first turn, a plurality of intermediate turns, and a last turn, end portions of said conductor forming said first and last turns being wound to position the shorter pair of said sides parallel to said axis, the intermediate portion of said conductor forming said intermediate turns being wound to position the longer pair of said sides parallel to said axis, insulation of predetermined thickness disposed on said first and last turns defining first and second parallel surfaces transverse to said axis, insulation of a lesser thickness disposed on said intermediate turns extending between said surfaces to produce a coil of uniform cross section, said coils being stacked in superposed relationship, and means for electrically connecting said coils in series.

4. A winding for a stationary induction apparatus, said winding comprising a plurality of cylindrical coils, each coil of said plurality of coils comprising a conductor having a cross section containing first and second pairs of sides of unequal lengths disposed substantially normal to each other, said conductor being wound helically along an axis to form a first turn, a plurality of intermediate turns, and a last turn, end portions of said conductor forming said first and last turns being wound to position the longer pair of said sides parallel to said axis, the intermediate portion of said conductor forming said intermediate turns being wound to position the shorter pair of said sides parallel to said axis, insulation of predetermined thickness disposed on said first and last turns defining first and second concentric surfaces of said coil, insulation of a lesser thickness disposed on said intermediate turns extending between said concentric surfaces providing a coil of uniform cross section, said coils being disposed in concentric layers, and means for connecting said coils in an electrical series relationship.

5. A disk type coil for a winding of a stationary induction apparatus, said coil comprising a continuous conductor having a substantially rectangular cross section, said conductor being wound in a spiral about an axis forming a first turn, a plurality of intermediate turns and a last turn, end portions of said conductor forming said first and last turns being wound to position the shorter side of said rectangular cross section parallel to said axis, the intermediate portion of said conductor forming said intermediate turns being wound to position the longer side of said rectangular cross section parallel to said axis, insulation of predetermined thickness disposed on said first and last turns defining two parallel planes transverse to said axis, and insulation of a lesser thickness disposed on said intermediate turns extending to said parallel planes to produce a coil of uniform cross section.

6. A cylindrical type coil for the winding of a stationary induction apparatus, said coil comprising a continuous conductor having a substantially rectangular cross section, said conductor being wound in a helix about an axis forming a first turn, a plurality of intermediate turns and a last turn, end portions of said conductor forming said first and last turns being wound to position the longer side of said rectangular cross section parallel to said axis, the intermediate portion of said conductor forming said intermediate turns being wound to position the shorter side of said rectangular cross section parallel to the axis of said winding, a predetermined amount of insulation disposed on said first and last turns defining two concentric radially spaced surfaces, and insulation of a lesser thickness disposed on said intermediate turns extending to said radially spaced surfaces to produce a coil of uniform cross section.

7. A coil for a winding of a stationary induction apparatus, said coil comprising a rectangular conductor including a plurality of adjacent strands having substantially equal rectangular cross sections, said conductor being wound in a helix forming a first turn, a plurality of intermediate turns and a last turn, said first and last turns being disposed with the longer side of said rectangular conductor parallel to the axis of said coil, said intermediate turns being disposed with the shorter side of said rectangular conductor parallel to said axis, insulation of predetermined thickness disposed on said first and last turns to define two concentric radially spaced surfaces, and insulation of lesser thickness disposed on said intermediate turns extending to said concentric surfaces to produce a coil of uniform cross section.

8. A coil for a winding of a stationary induction apparatus, said coil comprising a rectangular conductor including a plurality of adjacent strands having substantially equal rectangular cross sections, said conductor being wound in a spiral forming a first turn, a plurality of intermediate turns and a last turn, said first and said last turns being disposed with the shorter side of said rectangular conductor parallel to the axis of said coil, said intermediate turns being disposed with the longer side of said rectangular conductor parallel to said axis, insulation of predetermined thickness disposed on said first and last turns to define two parallel planes disposed transverse to said axis, and insulation of lesser thickness disposed on said intermediate turns extending to said parallel planes to produce a coil of uniform cross section.

9. An electrical coil having an extended cross section comprising a first turn, intermediate turns, and a last turn, said turns including a conductor having a cross section containing major and minor axes, the portion of said conductor forming said intermediate turns being disposed to position said minor axis parallel to the lengthwise direction of said extended cross section, the portion of said conductor forming one of said other turns being disposed to position said minor axis normal to said lengthwise direction, insulation of a predetermined thickness disposed on said first and last turns, and insulation of lesser thickness disposed on said intermediate turns without increasing the dimension of said extended cross section in the unextended direction.

10. A disk coil comprising a first turn, intermediate turns, and a last turn, said coil including a conductor having a cross section containing major and minor axes disposed substantially normal to each other, the portion of said conductor forming said intermediate turns being disposed to position said major axis parallel to the axis of said coil, the portion of said conductor forming one of said other turns being wound to position said major axis normal to the axis of said coil, insulation of a predetermined thickness disposed on said first and last turns, and insulation of a lesser thickness disposed on said intermediate turns without increasing the height of said coil.

11. A cylindrical coil comprising a first turn, intermediate turns, and a last turn, said coil including a conductor having a cross section containing major and minor axes disposed substantially normal to each other, the portion of said conductor forming said intermediate turns being disposed to position said major axis normal to the axis of said coil, the portion of said conductor forming one of said other turns being disposed to position said major axis parallel to said coil axis, insulation of a predetermined thickness disposed on said one turn and insulation of a lesser thickness disposed on said intermediate turns without increasing the radial width of said coil.

References Cited in the file of this patent

UNITED STATES PATENTS

| | | |
|---|---|---|
| 761,039 | Fortescue | May 24, 1904 |
| 1,118,446 | Roos | Nov. 24, 1914 |
| 1,834,114 | Wiggins | Dec. 1, 1931 |

FOREIGN PATENTS

| | | |
|---|---|---|
| 356,710 | Great Britain | Sept. 4, 1931 |